United States Patent Office 3,767,658
Patented Oct. 23, 1973

3,767,658
N-BENZOYLALKYLMORPHINAN DERIVATIVES AND SALTS THEREOF
Toshio Atsumi, Kenji Kobayashi, and Yoshiaki Takebayashi, Takarazuka, and Hisao Yamamoto, Nishinomiya, Japan, assignors to Sumitomo Chemical Company, Limited, Osaka, Japan
No Drawing. Filed Jan. 25, 1971, Ser. No. 109,610
Claims priority, application Japan, Feb. 3, 1970, 45/9,687, 45/9,689
Int. Cl. C07d 43/28
U.S. Cl. 260—285  10 Claims

ABSTRACT OF THE DISCLOSURE

Morphinan derivatives of the formula,

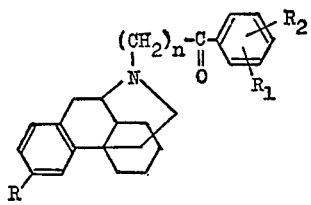

wherein R is a hydrogen atom, a hydroxyl group or a $C_1$–$C_3$ alkoxy group; $R_1$ is a hydrogen atom, a halogen atom, a $C_1$–$C_3$ alkyl group, a $C_1$–$C_3$ alkoxy group, a $C_1$–$C_3$ alkylthio group, a nitro group, a trifluoromethyl group, an amino group or a hydroxyl group; $R_2$ is a hydrogen atom, a $C_1$–$C_3$ alkyl group, a halogen atom or a $C_1$–$C_3$ alkoxy group; and $n$ is an integer of 2 to 4, which are useful as non-addicted analgesics and pain-relieving agents with calming effects. These morphinan derivatives are prepared by reacting a morphinan derivative of the formula,

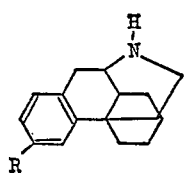

wherein R is as defined above, with a halogen derivative of the formula,

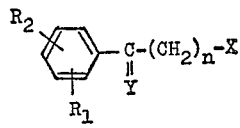

wherein $R_1$, $R_2$ and $n$ are as defined above; X is a halogen atom; and Y is an oxygen atom or an ethylenedioxy group, and further, in the case of Y=ethylenedioxy group, by hydrolyzing the resulting ethylenedioxy derivative of the formula,

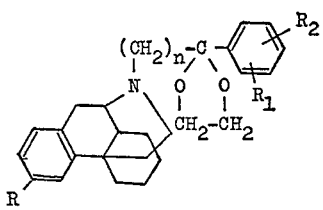

wherein R, $R_1$, $R_2$ and $n$ are as defined above.

---

The present invention relates to novel N-benzoylalkylmorphinan derivatives and their salts and production thereof which are useful as non-addicted analgesics and pain-relieving agents with calming effects.

Hitherto, many derivatives of morphine, morphinan and benzomorphan have been studied as analgesic drugs (see, for example, Belg. Pat. 611,000 or "Chemistry of the Opium Alkaloids," U.S. Public Health Reports, Suppl. No. 103, Washington (1932)), but almost all of them produce addiction or physical dependency besides analgesic activity. These analgesics always produce significant physical dependency by administrating orally or subcutaneously. To our surprise, however, the present compounds do not show any drug dependency in animal tests.

One object of the present invention is to provide these novel morphinan derivatives which are useful as non-narcotic analgesics.

Another object of the present invention is to provide a process for producing these useful morphinan derivatives.

A further object of the present invention is to provide a novel pharmaceutical composition containing these useful morphinan derivatives.

Other objects and advantages of the present invention will be apparent from the following description.

In order to accomplish these objects, the present invention provides novel morphinan derivatives of the formula,

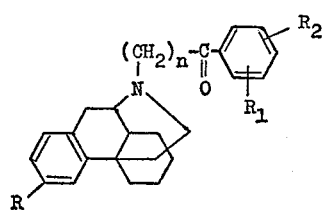
(I)

wherein R is a hydrogen atom, a hydroxyl group or a $C_1$–$C_3$ alkoxy group; $R_1$ is a hydrogen atom, a halogen atom, a $C_1$–$C_3$ alkyl group, a $C_1$–$C_3$ alkoxy group, a $C_1$–$C_3$ alkylthio group, a nitro group, a trifluoromethyl group, an amino group or a hydroxyl group; $R_2$ is a hydrogen atom, a $C_1$–$C_3$ alkyl group, a halogen atom or a $C_1$–$C_3$ alkoxy group; and $n$ is an integer of 2 to 4.

The present invention further provides a process for producing morphinan derivatives of the Formula I, which comprises hydrolyzing an ethylenedioxy derivative of the formula,

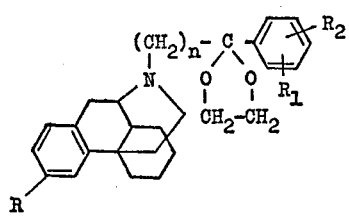
(II)

wherein R, $R_1$, $R_2$ and $n$ are as defined above. Compounds of Formula II also form a part of the present invention.

The present invention furthermore provides a process for producing morphinan derivatives of the Formula I, which comprises reacting a morphinan derivative of the formula,

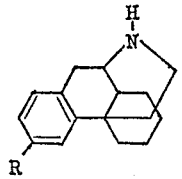
(III)

wherein R is as defined above, with a reactive halide of the formula,

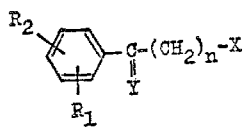

(IV)

wherein $R_1$, $R_2$ and $n$ are as defined above, X is a halogen atom; and Y is an oxygen atom or an ethylenedioxy group, and further, in the case of Y=ethylenedioxy, hydrolyzing the resulting ethylenedioxy derivative of the Formula II.

The present invention still further provides a novel pharmaceutical composition consisting of an effective amount of a morphinan derivative of the Formula I as active ingredient and pharmaceutically acceptable carrier or diluent.

The starting materials of this invention, morphinan derivatives, are prepared from corresponding known N-methyl-morphinan derivatives by a usual procedure.

The reaction of a morphinan derivative (III) with a reactive halide (IV) is usually accomplished in an organic inert solvent such as, for example, n-hexane, benzene, toluene, xylene, chloroform, dimethylformamide, methanol, ethanol, isopropanol, and the like. The reaction is preferably carried out in the presence of a base such as, for example, sodium carbonate, potassium carbonate, sodium bicarbonate, potassium bicarbonate, sodium hydroxide, potassium hydroxide, sodium amide, sodium hydride, pyridine, triethylamine and the like. The reaction smoothly proceeds at a temperature of 20° to 200° C., preferably 60° to 150° C. The reaction product may be readily recovered from the reaction mixture by filtrating after concentration of the solvent or by adding water or other suitable solvent in which the aimed product is insoluble or slightly soluble.

According to the process mentioned above, the following morphinan derivatives are prepared:

3-hydroxy-N-[4'-p-fluorophenyl)-4',4,-ethylenedioxy-n-butyl]-morphinan
N-[4'-(p-fluorophenyl)-4',4'-ethylenedioxy-n-butyl]-morphinan
3-methoxy-N-[4'-(p-fluorophenyl)-4',4'-ethylenedioxy-n-butyl]-morphinan
3-hydroxy-N-[4'-(p-methoxyphenyl)-4',4'-ethylenedioxy-n-butyl]-morphinan
N-[4'-(p-methoxyphenyl)-4',4'-ethylenedioxy-n-butyl]-morphinan
N-[4'(3,4-dimethoxyphenyl)-4',4'-ethylenedioxy-n-butyl]-morphinan
3-hydroxy-N-(γ-benzoyl-n-propyl)-morphinan
N-(γ-benzoyl-n-propyl)-morphinan
3-hydroxy-N-[3'-[(p-fluorophenyl)-3',3'-ethylenedioxy-n-propyl]-morphinan
N-[5'-(p-fluorophenyl)-5',5'-ethylenedioxy-n-pentyl]-morphinan In the persent invention, an ethylenedioxy derivative (II) mentioned above is easily converted into a desired morphinan derivative (I) by hydrolyzing in the presence of an acid.

The hydrolysis of the said ethylenedioxy derivative (II) is carried out in a suitable solvent such as, for example, water, alcohol such as methanol, ethanol, n- or iso-propanol, n-butanol and the like, at a temperature within a range of room temperature to the boiling point of the solvent used. A catalytic amount of acid is necessary in this reaction. Examples of acids include mineral acids such as hydrochloric acid, sulfuric acid and phosphoric acid, and organic acids such as acetic acid and the like. The reaction is usually completed after 0.5 to 2 hours.

The thus prepared morphinan derivative (I) may be converted into its acid-addition salt by conventional procedures, for example by treating the derivative with an organic or inorganic acid (e.g. hydrochloric acid, maleic acid, citric acid, tartaric acid, lactic acid, acetic acid, gluconic acid and the like) in water or other suitable inert organic solvent (e.g. methanol, ethanol and the like). According to the process of the present invention, there are produced such morphinan derivatives as shown below.

3-hydroxy-N-[γ-(p-fluorobenzyl)-n-propyl]-morphinan
N-[γ-(p-fluorobenzoyl)-n-propyl]-morphinan
3-hydroxy-N-(γ-benzoyl-n-propyl)-morphinan
3-methoxy-N-[γ-(p-fluorobenzoyl)-n-propyl]-morphinan
3-hydroxy-N-[γ-(p-methoxybenzoyl)-n-propyl]-morphinan
N-[γ-(3,4-dimethoxybenzoyl)-n-propyl]-morphinan
N-(γ-benzoyl-n-propyl)-morphinan
3-hydroxy-N-[δ-(p-fluorobenzoyl)-n-butyl]-morphinan
N-[δ-(p-fluorobenzoyl)-n-butyl]-morphinan
3-hydroxy-N-[β-(p-fluorobenzoyl)-ethyl]-morphinan
N-[β-(p-fluorobenzoyl)-ethyl]-morphinan and their hydrochloric acid salts, lactic acid salts, maleic acid salts, citric acid salts, tartaric acid salts and the like.

The present morphinan derivatives (I), for example

N-[γ-(p-fluorobenzoyl)-n-propyl]-morphinan
3-hydroxy-N-[γ-(p-fluorobenzoyl)-n-propyl]-morphinan
N-[β-(p-fluorobenzoyl)-ethyl]-morphinan and
3-hydroxy-N-[β-(p-fluorobenzoyl)-ethyl]-morphinan have shown non-narcotic analgesic activity in spite of narcotic product-like structure in mice, rats and other animals. In a chronic test, these compounds do not produce any physical dependency in experimental animals.

Furthermore, the present morphinan derivatives (I) show remarkable analgesic activity in a writhing test, and some of them have equal or more potent analgesic activity in comparison with those of the most excellent commercial product, 2'-hydroxy-5,9-dimethyl-2-(3,3-dimethyl-allyl)-6,7-benzomorphan (Pentazocine) (Table I).

$ED_{50}$ was calculated according to the Litchfield-Wilcoxon's method.

TABLE I

| Compound: | Effect in a writhing test ($ED_{50}$) mg./kg. s.c.) |
|---|---|
| N - [γ - (p - fluorobenzoyl) - n - propyl]-morphinan | 16.8 |
| 3 - hydroxy - N - [γ-(p-fluorobenzoyl)-n-propyl]-morphinan | 15.7 |
| 3 - hydroxy - N - [γ-(p-methoxybenzoyl)-n-propyl]-morphinan | 9.4 |
| 3 - hydroxy - N - (γ-benzoyl-n-propyl)-morphinan | 17.0 |
| 3 - hydroxy - N - [β-(p-fluorobenzoyl)ethyl]-morphinan | 15.9 |
| 2' - hydroxy - 5,9 - dimethyl-2-(3,3-dimethyl-allyl)-6,7-benzomorphan (Pentazocine) | 17.3 |

Furthermore, these compounds showed effective results not only in this writhing test, but also in other analgesic tests, for example, a hot plate test and a Haffiner method test. Moreover, the present compounds have a moderate calming effect, which effect sometimes boosts the analgesic effect. Moreover, these present compounds have not any unfavorable side effects, for example, vomitting, exciting effect, constipation, allergic reactions, respiratory depression, etc., unlike other morphine, morphinan and benzomorphan analgesics.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection.

Alternatively, the compounds can be incorporated in unit dosage (1–15 mg.) form as tablets or capsules for oral administration either alone or in combination with suitable adjuvants such as calcium carbonate, starch, lactose, talc, magnesium stearate, gum acacia, and the like.

The following examples are representative of the methods of production of the compounds. Modifications of these procedures will be obvious to those skilled in the art and these examples are not to be construed as limiting the scope of this invention.

EXAMPLE 1

N-[γ-(p-fluorobenzoyl)-n-propyl]-morphinan (a) N-[4'-(p-fluorophenyl) - 4',4' - ethylenedioxy-n-butyl]-morphinan: To a mixture of 2.27 g. of morphinan, 1.26 g. of sodium bicarbonate and 25 ml. of dimethylformamide is added 2.69 g. of 4-(p-fluorophenyl)-4,4-ethylenedioxy-1-chlorobutane. The resultant mixture is stirred at 135°–145° C. for 4 hours. The solvent is removed under reduced pressure. To the residue is added water. The mixture is extracted several times with ether. The combined extract is washed with water saturated with sodium chloride, dried over anhydrous sodium sulfate, and filtered. The filtrate is concentrated to dryness to give N-[4'-(p-fluorophenyl) - 4',4' - ethylenedioxy-n-butyl]-morphinan as a brown oil.

IR $\nu_{liq.}^{cm.^{-1}}$: 1595, 1500, 752, 715, 695

(b) N - [γ-(p-fluorobenzoyl)-n-propyl]-morphinan: A mixture of 4.2 g. of N-[4'-(p-fluorophenyl)-4',4'-ethylenedioxy-n-butyl]-morphinan, 20 ml. of methanol, 10 ml. of water and 2 ml. of concentrated hydrochloric acid is refluxed for 1 hour. The reaction mixture is treated with charcoal and filtered. After the filtrate is concentrated under reduced pressure, it is made alkaline with an aqueous ammonia and extracted with ether. The ether extracts are washed with water saturated with sodium chloride, dried over anhydrous sodium sulfate, and filtered. The filtrate is concentrated to dryness to give 2.9 g. of the crude compound, which is converted into its hydrochloride salt. Recrystallization from methanol-acetone gives N-[γ-(p-fluorobenzoyl) - n - propyl]-morphinan hydrochloride, M.P.: 211°–213° C.

IR $\nu_{paraffin}^{cm.^{-1}}$: 2400, 1675, 1590, 1500, 838, 808, 755, 715

*Elementary analysis.*—Calcd. for $C_{26}H_{31}NOClF$ (percent): C, 72.96; H, 7.30; N, 3.27; Cl, 8.28. Found (percent): C, 73.18; H, 7.41; N, 3.10; Cl, 8.02.

EXAMPLE 2

3-hydroxy-N-[γ-(p-fluorobenzoyl)-n-propyl]-morphinan (a) 3-hydroxy-N-[4'-(p-fluorophenyl) - 4',4' - ethylenedioxy-1'-butyl]-morphinan: A mixture of 0.49 g. of 3-hydroxy-morphinan, 0.25 g. of sodium bicarbonate, 0.59 g. of 4-(p-fluorophenyl)-4,4-ethylenedioxy-1-chlorobutane and 30 ml. of dimethylformamide is stirred at 130°–145° C. for 4 hours. This mixture is concentrated under reduced pressure until most of the solvent has been removed, and water is added thereto. The mixture is extracted with ether. The ether extracts are washed with water saturated with sodium chloride, dried over anhydrous sodium sulfate, and filtered. The filtrate is treated with decolorizing charcoal and concentrated under reduced pressure to give 3-hydroxy-N-[4'-(p-fluorophenyl)-4',4'-ethylenedioxy-1'-butyl]-morphinan as an amorphous product.

(b) 3-hydroxy-N-[γ-(p-fluorobenzoyl)-n-propyl]-morphinan: To a mixture of 0.45 g. of 3-hydroxy-N-[4'-(p-fluorophenyl) - 4',4' - ethylenedioxy-1'-butyl]-morphinan, 10 ml. of methanol and 4 ml. of water is added 1 ml. of concentrated hydrochloric acid. After the resultant mixture is refluxed for 1 hour, the mixture is concentrated under reduced pressure. The residue is made alkaline with an aqueous ammonia and extracted with ether. The ether extract is washed with water saturated with sodium chloride, dried over anhydrous sodium sulfate, and filtered. The filtrate is evaporated to dryness under reduced pressure. Trituration of the residue with isopropyl ether gives 3 - hydroxy-N-[γ-(p-fluorobenzoyl)-n-propyl]-morphinan.

IR $\nu_{paraffin}^{cm.^{-1}}$: 1678, 1602, 1500

According to the procedure of example, the next compounds are obtained:

3-hydroxy-N-[γ-(p-methoxybenzoyl)-n-propyl]-morphinan
N-[γ-(p-methoxybenzoyl)-n-propyl]-morphinan
3-hydroxy-N-[β-(p-fluorobenzoyl)-ethyl]-morphinan
3-methoxy-N-[γ-(p-fluorobenzoyl)-n-propyl]-morphinan
3-hydroxy-N-(γ-benzoyl-n-propyl)-morphinan

What is claimed is:
1. A morphinan derivative of the formula,

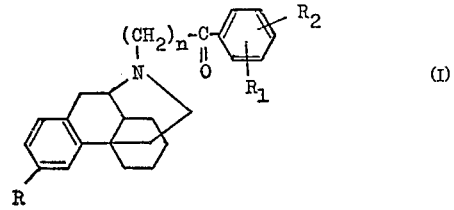

wherein R is a hydrogen atom, a hydroxyl group or $C_1$–$C_3$ alkoxy group; $R_1$ is a hydrogen atom, a halogen atom, a $C_1$–$C_3$ alkyl group, a $C_1$–$C_3$ alkoxy group, a $C_1$–$C_3$ alkylthio group, a nitro group, a trifluoromethyl group, an amino group or a hydroxyl group; $R_2$ is a hydrogen atom, a $C_1$–$C_3$ alkyl group, a halogen atom or a $C_1$–$C_3$ alkoxy group; and $n$ is an integer of 2 to 4, and pharmaceutically acceptable acid-addition salts thereof.

2. A morphinan derivative of the formula,

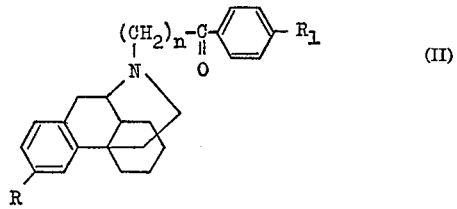

wherein R is a hydrogen atom, a hydroxyl group or a methoxy group; $R_1$ is a hydrogen atom, a fluorine atom or a methoxy group; and $n$ is an integer of 2 or 3, and pharmaceutically acceptable acid-addition salts thereof.

3. 3 - hydroxy - N - [γ-(p-fluorobenzoyl)-n-propyl]-morphinan.

4. N-[γ-(p-fluorobenzoyl)-n-propyl]-morphinan.

5. 3-hydroxy - N - [γ-(p-methoxybenzoyl)-n-propyl]-morphinan.

6. N-[γ-(p-methoxybenzoyl)-n-propyl]-morphinan.
7. 3 - hydroxy - N - [β - (p - fluorobenzoyl) - ethyl]-morphinan.
8. 3-methoxy-N-[γ-(p - fluorobenzoyl) - n - propyl]-morphinan.
9. 3-hydroxy-N-(γ-benzoyl-n-propyl)-morphinan.
10. A compound of the formula,

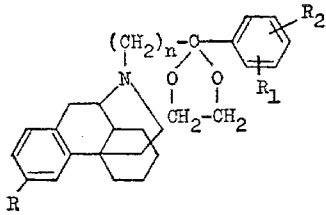

(11)

wherein R, $R_1$, $R_2$ and $n$ are as defined in claim 1.

References Cited
UNITED STATES PATENTS

| | | | |
|---|---|---|---|
| 3,074,952 | 1/1963 | Casy et al. | 260—293.4 |
| 3,004,977 | 10/1961 | Janssen | 260—294.3 |
| 3,080,372 | 3/1963 | Janssen | 260—294.7 |
| 3,438,991 | 4/1969 | Janssen | 260—294.7 |
| 3,462,444 | 8/1969 | Beckett et al. | 260—294.7 |

FOREIGN PATENTS

| | | | |
|---|---|---|---|
| 644,679 | 3/1964 | Belgium | 260—293.4 |
| 1,362,540 | 4/1964 | France | 260—293.4 |

HENRY R. JILES, Primary Examiner

G. T. TODD, Assistant Examiner

U.S. Cl. X.R.

260—293.54, DIG. 13; 424—267